United States Patent [19]

Maitland et al.

[11] Patent Number: 4,805,180
[45] Date of Patent: Feb. 14, 1989

[54] DISCHARGE TUBE APPARATUS

[75] Inventors: Arthur Maitland, St. Andrews, Scotland; Hugh Menown; Christopher V. Neale, both of Chelmsford, United Kingdom

[73] Assignee: English Electric Valve Company Limited, Chelmsford, United Kingdom

[21] Appl. No.: 870,743

[22] Filed: Jun. 4, 1986

[30] Foreign Application Priority Data

Jun. 4, 1985 [GB] United Kingdom ............... 8514058
Nov. 15, 1985 [GB] United Kingdom ............... 8528175

[51] Int. Cl.$^4$ .............................................. H01S 3/03
[52] U.S. Cl. .................................... 372/61; 372/62; 372/65; 313/17; 313/44
[58] Field of Search ............... 372/61, 62, 65; 313/17, 313/25, 44, 564

[56] References Cited

U.S. PATENT DOCUMENTS

| 3,626,319 | 12/1971 | Young | 372/40 |
| 3,813,571 | 5/1974 | Basiulis | 313/326 |
| 3,814,974 | 6/1974 | Basiulis | 313/326 |
| 3,851,272 | 11/1974 | Shull et al. | 372/65 |

FOREIGN PATENT DOCUMENTS

| 0169058 | 1/1986 | European Pat. Off. |
| 1152734 | 9/1966 | United Kingdom |
| 1336667 | 3/1971 | United Kingdom |
| 1338147 | 4/1971 | United Kingdom |
| 1454912 | 1/1974 | United Kingdom |
| 2037065 | 12/1979 | United Kingdom |
| 2037478 | 7/1980 | United Kingdom |

Primary Examiner—William L. Sikes
Assistant Examiner—Xuan Thi Vo
Attorney, Agent, or Firm—Spencer & Frank

[57] ABSTRACT

Discharge tube apparatus includes an outer containing vessel and a structure comprising for example five metal cylinders located co-axially within it. Each of the metal cylinders includes projecting spacers on its outer surface which serve to space it from adjacent ones. Such a structure is thermally insulating and may be arranged to enable a large temperature difference to be maintained between the interior of the discharge tube and the outer containing vessel. In other embodiments, a plurality of structures are included disposed along the axis of the tube. Also, dispenser segments for dispensing part of the active medium of a metal vapor laser may be included and arranged to shield vulnerable surfaces in the tube from direct exposure to the discharge.

29 Claims, 9 Drawing Sheets

PRIOR ART

DISCHARGE TUBE APPARATUS

BACKGROUND OF THE INVENTION

This invention relates to discharge tube apparatus and, more particularly, to apparatus in which it is wished to maintain a temperature difference between parts of the tube.

Figure 1:
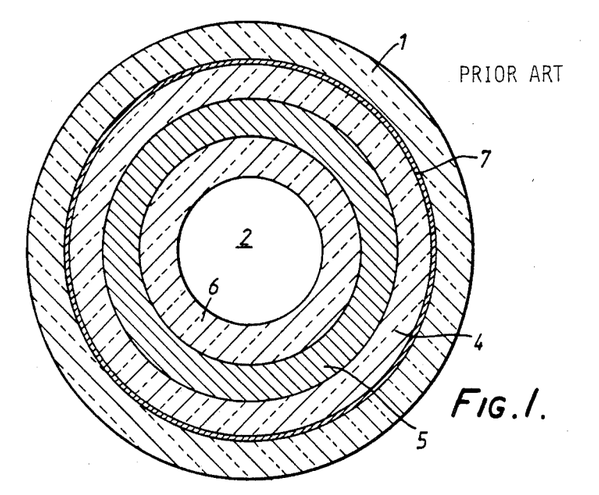
FIGS. 1 and 2 are schematic transverse and longitudinal sections, respectively, of apparatus in accordance with the prior art.
Figure 2:
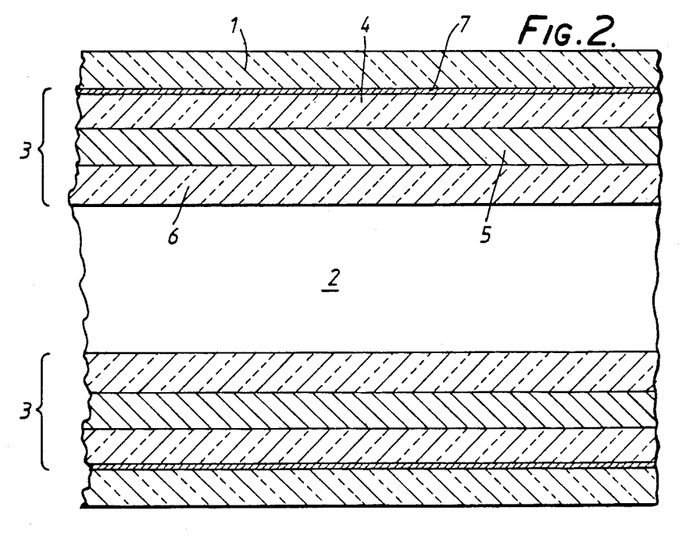

Many gas discharge tubes used in laser oscillators or amplifiers require a laser amplifying medium of ionized gas to be kept at a high temperature, in the region of two thousand degrees Celsium whilst having the amplifying medium contained within a vessel, the walls of which would deteriorate at such high temperatures and must thus be kept at a lower temperature. One way in which this has previously been done is to arrange a structure having low thermal conductivity between the amplifying medium and the vessel walls, as illustrated in FIGS. 1 and 2 of the accompanying drawings which are transverse and longitudinal sections respectively of part of a laser discharge tube suitable for copper or gold vapour lasers. The containing vessel 1 of quartz, which can withstand temperatures of only about 1000° C., contains the laser amplifying medium, which typically is a metal vapour and a buffer gas, which must be maintained at a suitably high temperature for laser action to occur. The temperature of the amplifying medium depends upon the metal vapour used and may be up to 2000° C. in some cases. A thermally insulating tube 3 is located coaxially within the vessel 1 to enable a suitable temperature difference to be maintained between the vessel 1 and the amplifying medium 2. The tube 3 is of a sandwich construction, typically having an outer alumina layer 4, an adjacent layer of zirconia felt 5, and an inner layer 6 of alumina. In some applications it may be desirable to include an additional coating 7 of tantalum between the outer layer 4 and the quartz vessel 1.

SUMMARY OF THE INVENTION

The present invention seeks to provide improved discharge tube apparatus.

According to a first aspect of the invention, there is provided discharge tube apparatus comprising a hollow structure within which in operation a discharge is formed which includes a plurality of metal cylinders arranged coaxially about and spaced apart from one another by spacers whereby in operation a desired temperature gradient is obtained between an inner surface and an outer surface of the structure. The metal cylinders are not necessarily of circular transverse section but this is a particularly convenient configuration. Also, a cylinder need not be continuous about its circumference and manufacture may be facilitated if there is a break in its wall.

By suitably selecting the number of cylinders to be arranged coaxially about one another, appropriate thermal insulation properties of the structure may be chosen as required for particular applications.

Thus a low degree of thermal insulation may be chosen by using only, say, two or three cylinders. The use of such a high thermal conductivity structure, where the apparatus is a laser, for example, results in a considerable increase in the threshold power level compared to that at which conventional devices operate; that is, more power must be applied to the gas filling of the apparatus before laser action is initiated. Once laser action begins, however, there is more energy available for the process than is the case when the threshold power level is less, and thus a more powerful laser is possible.

Apparatus in accordance with the invention also, by choosing an appropriate number of cylinders to give a low thermal conductivity structure, permits a large temperature difference to be maintained between an inner surface of the structure where a high temperature laser amplifying medium, for example, is contained, and an outer surface which may be adjacent the wall of a containing vessel which may be, for example, of quartz, ceramic or metal. Large thermal gradients may be achieved which, if a conventional ceramic thermal insulator were used, could cause it to crack. Also, such apparatus has a much smaller thermal capacity, perhaps an order of magnitude less than a conventional ceramic tube having a comparable degree of thermal insulation. Thus the time required to attain the operating temperature of the laser may be considerably reduced. Also, since the apparatus may have a low thermal mass, this results in less energy being stored, which is advantageous where cooling fluid is used in case of its loss. A further advantage of having a boundary to the ionized gas provided by the innermost metal cylinders is that bombardment by high energy particles has a less deleterious effect on a metal surface than it would on a ceramic one. Also the structure itself may comprise the discharge vessel and an outer tube of ceramic or quartz, say, may not be required.

Apparatus in accordance with the invention tends to withstand higher temperatures than a ceramic tube if suitable refractory metals such as molybdenum or tantalum are employed. At these higher temperatures, ceramic would tend to soften or even melt. The ceramic could also undergo chemical changes, resulting in the evolution of molecules which may poison the laser amplifying medium and prevent laser action from occurring. The large amounts of ceramic and ceramic felt conventionally used in discharge apparatus contain correspondingly large quantities of gas, and thus prolonged out-gassing occurs which usually must be substantially completed before laser action can occur. The gas molecules evolved during out-gassing contaminate the amplifying medium and can prevent laser action. It is a necessary common practice, therefore, to flow the buffer gas continuously through the laser discharge tube, especially where the laser is a metal vapour laser. This can result in loss of metal components from the laser amplifying medium to the region at which the buffer gas leaves the tube. By employing the invention, however, it may not be necessary to use flowing buffer gas, since much less ceramic may be used. Thus "sealed-off" operation, that is, where there is no through-flow of buffer gas, becomes possible for long periods of upwards of several hundred hours of laser operation.

Apparatus in accordance with the invention may also reduce processing problems associated with ceramic thermally insulating structures of conventional devices since the metal cylinders may be manufactured and assembled relatively easily.

A set of metal cylinders may be included in an arrangement, with an appropriate number being selected as part of the structure to give a desired thermal conductivity of the structure. This gives flexibility, enabling the apparatus to be adapted to a required use.

Preferably the spacers separating the cylinders are integral with the cylinders. This eliminates any problem which might arise in joining discrete spacers to a surface, especially where high temperature operation is required. It also enables the spacers to be readily positioned at the desired location. Preferably, the spacers are dimples, that is, the surface of a cylinder is locally deformed to produce a projecting portion. Dimples may be easily produced in the metal of the cylinder.

Advantageously, a surface of a metal cylinder is covered with thermally insulating material. The thermally insulating material for example could be alumina or zirconia deposited onto the metal surface by flame or plasma techniques, or could be an anodised surface layer if tantalum or some other suitable metal forms the metal cylinders. This gives increased thermal insulation without greatly increasing the amount of ceramic used, and may reduce thermal conduction through the spacers where they are of metal. The metal cylinder may act as a supporting surface, enabling only a very thin layer of insulating material to be used since the material need not then be self-supporting. This also enables the discharge tube to be operated at temperatures at which, for example ceramic, tends to soften. Preferably the outer surface of each cylinder is covered with thermally insulating material. However, only a few cylinders may have a surface so covered, and the inner surface or both the inner and outer surfaces could be covered with the insulating material. In another embodiment, only the dimples, or other metal spacers, and their immediate surroundings need be covered with the thermally insulating material.

Advantageously, a metallic member is included, connecting one cylinder with another whereby relative movement between them is restricted. Preferably, the metallic member is arranged through apertures in cylinders which it connects. The metallic member is conveniently a rod of the minimum thickness consistent with its purpose, such that there is only a small amount of heat conducted along it. In an alternative method for preventing relative movement, a dimple on the surface of one cylinder could be located within a corresponding depression in the surface of an adjacent cylinder. The metallic member could be arranged to connect all the cylinders of the structure but alternatively and advantageously, where there are more than two cylinders included in the structure, it is arranged to connect a pair of cylinders having facing surfaces, thus reducing direct conduction from the inner to the outer surface of the structure.

Preferably, a plurality of structures are included, and are disturbed along the direction of the longitudinal axis of the discharge tube. Preferably, an adjacent pair of structures is spaced apart by an electrically insulating spacer. It is preferred that, where a plurality of structures are employed, a cylinder included in one structure is interleaved with cylinders included in an adjacent structure. Such interleaving or "labyrinthing", where there is some overlap between cylinders of adjacent structures without there being electrical contact, enables electrically insulating spacers at the outer part of the discharge tube to be shielded from contents of the amplifying medium which might damage them or produce electrically conducting paths across them, whilst still enabling the structures to remain electrically isolated from one another. Preferably, where such interleaving is employed, a cylinder included in one structure is spaced from a cylinder included in an adjacent structure by an electrically insulating spacer, this giving improved rigidity.

Advantageously, a first group of structures is included, the structures being distributed along the direction of the longitudinal axis of the discharge tube and a second group of structures is arranged within and electrically isolated from structures of the first group. Preferably, where an adjacent pair of structures of the first group are spaced apart by an electrically insulating spacer, a structure of the second group is arranged to lie within and overlap the spacer, and hence shield it from direct exposure to the discharge. It is preferred that in this case metal spacers, on the outer surface of the structure of the second group, are arranged to substantially fix the structure relative to the spacer.

Advantageously, a dispenser segment for dispensing a substance, generally a metal, which forms at least part of a laser amplifying medium is included, and preferably, the segment is arranged such that it shields an electrically insulating surface. This arrangement may be used in conjunction with interleaving of cylinders included in different structures, or may be used where no such interleaving is used. Preferably, where dispenser segments are used to shield an electrically insulating surface, two adjacent dispenser segments are arranged to overlap and are electrically isolated from one another. Advantageously, one of the adjacent dispenser segments includes a projecting portion and the other includes an indentation in which the projecting portion is arranged to lie. Thus labyrinthing of dispenser segments may also be employed to shield vulnerable surfaces in the tube, such as an electrically insulating spacer.

According to a second aspect of the invention, laser discharge tube apparatus comprises a metal vapour laser amplifying medium and is arranged to operate at a substantially high temperature and sealed-off. By a substantially high temperature, it is meant in the region of 1600° C. upwards.

According of a third aspect of the invention there is provided discharge tube apparatus comprising a plurality of low thermal conductivity structures, each of which includes a plurality of metal cylinders arranged coaxially about and spaced apart from one another, a cylinder included in one structure being interleaved with cylinders included in an adjacent structure.

Preferably, a cylinder included in one structure and interleaved with a cylinder included in an adjacent structure is spaced from it by an electrically insulating spacer. Advantageously, a cylinder is substantially fixed relative to the electrically insulating spacer by metal projections from its surface. It is preferred that a cylinder is arranged to shield a surface of the spacer from direct exposure to a discharge within the tube. Preferably an end of the cylinder arranged to shield the spacer is arranged substantially parallel to the surface. This could be done by flaring the end of the cylinder or by bending it.

BRIEF DESCRIPTION OF THE DRAWINGS

The invention is now further described by way of example with reference to the accompanying drawings, in which.

DESCRIPTION OF THE PREFERRED EMBODIMENTS

FIGS. 1 an 2 illustrate prior discharge tube apparatus.

Figure 3:
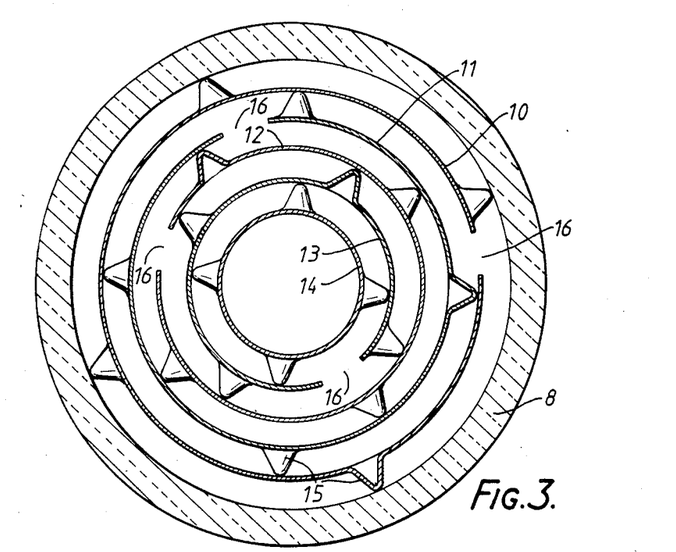
FIGS. 3 and 4 are schematic transverse and longitudinal sections respectively of apparatus in accordance with the invention.
Figure 4:
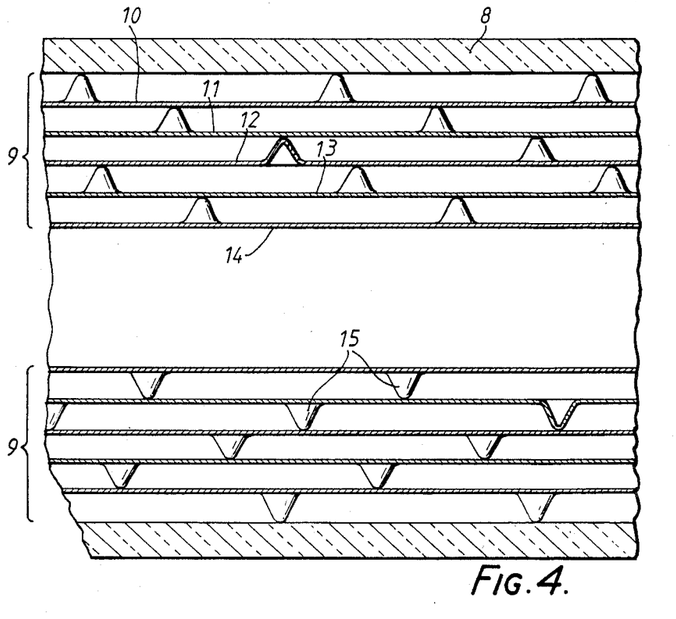
Figure 5:
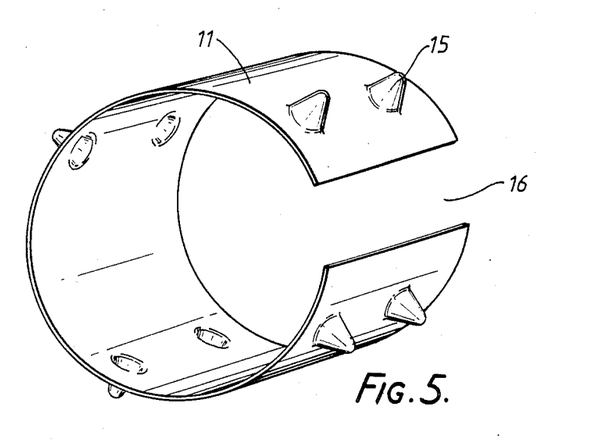
FIG. 5 is a perspective view of part of the apparatus of FIGS. 3 and 4.

With reference to FIGS. 3 and 4, discharge tube apparatus in accordance with the invention includes a quartz containing vessel 8 of circular cross-section and includes a thermally insulating structure 9 located coaxially within the vessel 8. The structure 9 comprises five cylinders 10, 11, 12, 13 and 14 of molybdenum arranged coaxially about one another, within the vessel 8. One of the cylinders 11 is shown in FIG. 5. Each of the cylinders 11 to 14 includes a plurality of mutually spaced apart dimples 15 having gaps therebetween, projecting from its outer surface and these serve to space it from the adjacent surrounding cylinder. The outer cylinder 10 also includes a plurality of dimples 15 projecting from its outer surface which space it from the vessel 8. None of the cylinders 10 to 13 in this embodiment has a continuous surface around its circumference, each having a gap 16 in its wall. This facilitates manufacture of the cylinders and enables their resilience to be used to hold the cylinders of the structure 9 firmly together during assembly. The innermost cylinder 14 has a continuous surface around its circumference. The dimples are evenly distributed over the outer surfaces of the cylinders 10 to 14 to provide a uniformly supported structure. The melting point of molybdenum is $2620° \pm 10°$ C. and the thermally insulating structure 9 is thus suitable for prolonged use with interior temperatures up to about 1700° C. In this embodiment, each of the cylinders 10 to 14 has a thickness of 0.127 mm and they are spaced apart by a distance up to about one millimeter. At relatively low temperatures heat transfer between the outer and inner surface of the structure 9 is mainly by conduction through the dimples but as the temperature rises radiation loss becomes more significant.

Each cylinder is formed by first rolling metal sheet and then using a tool to impress the dimples in the surface. The tool might go through the metal and result in some of the dimples being broken, but this does not affect their effectiveness as spacers.

Figure 6:
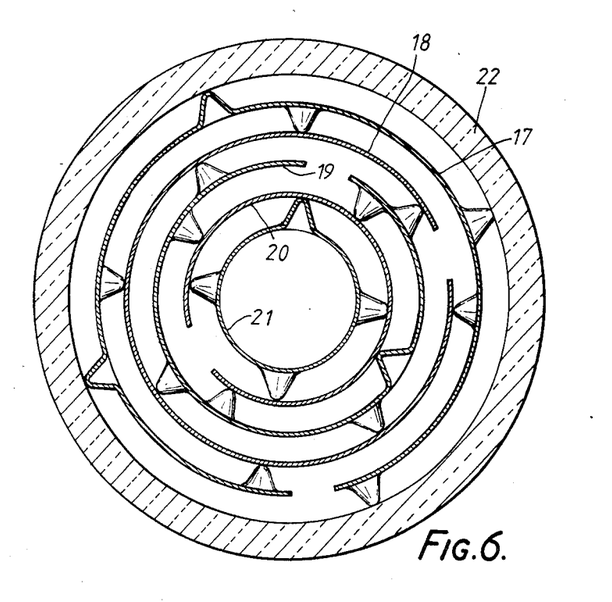
FIG. 6 is a schematic transverse section of another apparatus in accordance with the invention.

With reference to FIG. 6, another apparatus in according with the invention also includes a thermally insulating structure having five cylinders, 17 to 21, located within a cylindrical quartz vessel 22. In this embodiment, the outer cylinder 17 has dimples extending from both its inner and outer surfaces, spacing it from the outer containing vessel 22 and from the adjacent cylinder 18, which is smooth, having no dimples on its surfaces. The cylinder 19 adjacent to and surrounded by the smooth cylinder 18 also has projections from both its inner and outer surfaces. The cylinder 20 surrounded by cylinder 19 is smooth, and the innermost cylinder 21 has dimples only on its outer surface.

Figure 7:
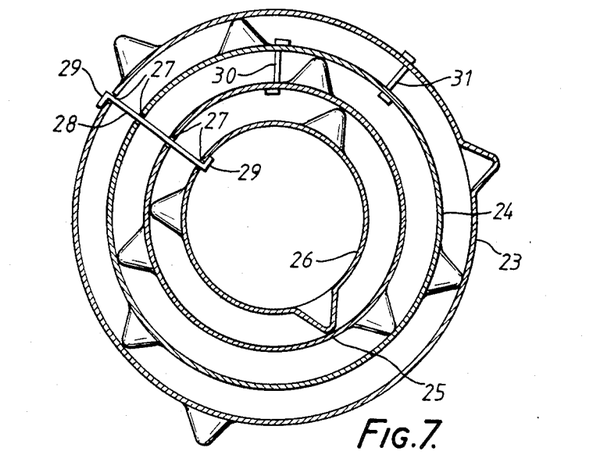
FIGS. 7 and 8 are schematic transverse and partial longitudinal sections respectively of further apparatus in accordance with the invention.
Figure 8:
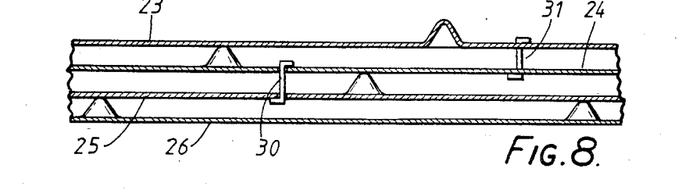

With reference to FIGS. 7 and 8, another structure is shown having four nested cylinders 23, 24, 25 and 26, each of which has dimples extending from its outer surface. In this embodiment, the cylinders are of tantalum and each is complete around its circumference, although each of them includes an aperature 27. The melting point of tantalum is $2996° \pm 50°$ C. and thus the structure shown in FIGS. 7 and 8 would be used where there is prolonged exposure to interior temperatures of up to 1900° C. A thin metal rod 28 (tungsten, tantalum or molybdenum would be suitable) is located through the apertures 27 in all of the cylinders 23 to 26, thereby substantially preventing them from moving relative to one another in an axial direction. The rod 28 is held in position by its ends 29 being bent over or enlarged. Where a metal rod is used to restrict movement it need not pass through every cylinder but may connect only some of the adjacent cylinders, as shown in FIG. 8, where rods 30 and 31 are arranged to prevent axial movement between three of the cylinders 23, 24 and 25. In practice, either one rod linking all the cylinders of a structure would tend to be used, or a series of rods each connecting only a few of the cylinders would be employed.

Figure 9:
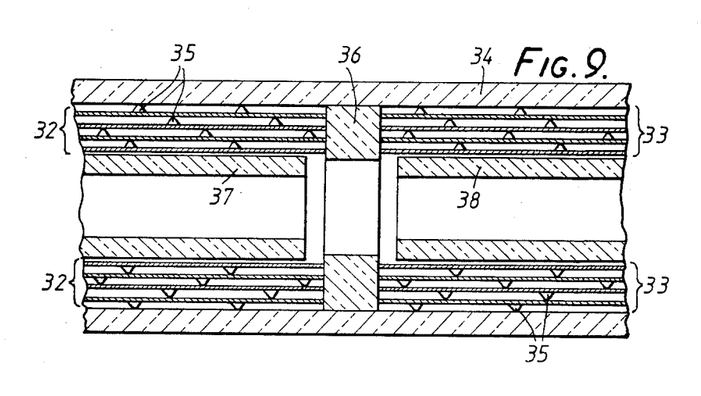
FIG. 9 is a schematic longitudinal section of apparatus in accordance with the invention.

A plurality of thermally insulating structures may be included in a discharge tube, a typical number being thirty or forty. With reference to FIG. 9, a plurality of structures, only two of which 32 and 33 shown, are arranged coaxially within an outer containing vessel 34 and spaced apart along its length. Each of the cylinders included in a structure has dimples 35 extending from its outer surface. The cylinders of one structure 32 are separated from those of an adjacent cylinder 33 by a ceramic spacer ring 36 which is electrically insulating. In this embodiment, dispenser segments 37 and 38 are included, located within and adjacent to the structures 32 and 33. Each dispenser segment comprises sintered tungsten loaded with copper, the copper vaporising during operation of the tube to form part of the amplifying medium of the laser.

Figure 10:
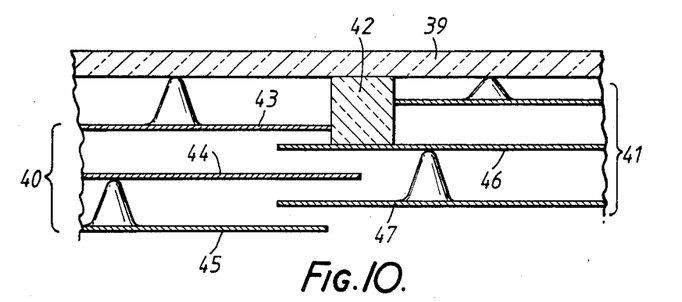
FIGS. 10, 11 and 12 are schematic partial longitudinal sections illustrating different configurations of apparatus in accordance with the invention.

With reference to FIG. 10, a metal vapour laser discharge tube has an outer quartz vessel 39 and a plurality of thermally insulating structures, only two of which 40 and 41 are illustrated, distributed within it along its longitudinal axis. Adjacent structures 40 and 41 are electrically isolated from one another and are arranged such that a ceramic insulating ring 42 located between them is shielded from deposition of metal from the amplifying medium upon its surface. Cylinders included in the two structures 40 and 41 are interleaved or labyrinthed such that cylinders 43, 44 and 45 of the structure 40 overlap, in an axial direction, cylinders 46 and 47 of the adjacent structure 41. This shielding arrangement also reduces thermal gradients across the ceramic ring 42 and hence reduces the possibility of it cracking.

Figure 11:
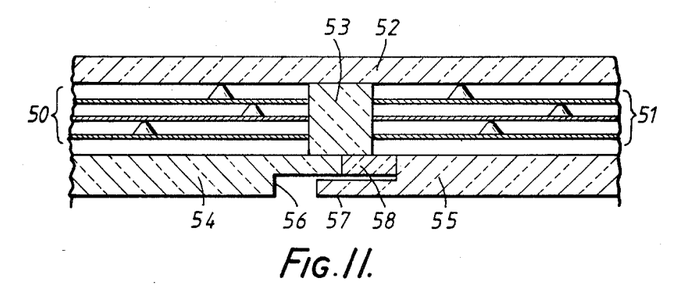

With reference to FIG. 11, in further discharge tube apparatus in accordance with the invention, two adjacent low thermal conductivity structures 50 and 51, which are not interleaved, are spaced apart within a quartz vessel 52 by a ceramic spacer 53. Dispenser segments 54 and 55 are also arranged along the length of the tube and are machined such that they act as a shield to contents of the amplifying medium, preventing them from reaching the ceramic spacer 53. The dispenser segment 54 is machined to be of less thickness at its ends than at its centre, to give a ledge or indentation 56. The other dispenser segment 55 is similarly machined to produce another ledge, which may be termed a projecting portion 57, which is arranged to lie in the indentation 56. Another ceramic spacer ring 58 may be included between the dispenser segments 54 and 55 to ensure no electrical contact occurs between them.

Figure 12:
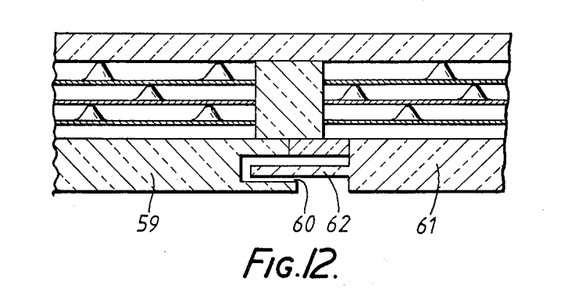

Another configuration of dispenser segments is illustrated in FIG. 12. One dispenser segment 59 has a slot 60 machined at one end. An adjacent dispenser segment 61 is machined to leave a projecting portion 62 which is arranged to lie within the slot 60 without making physical contact with the dispenser segment 59.

Figure 13:
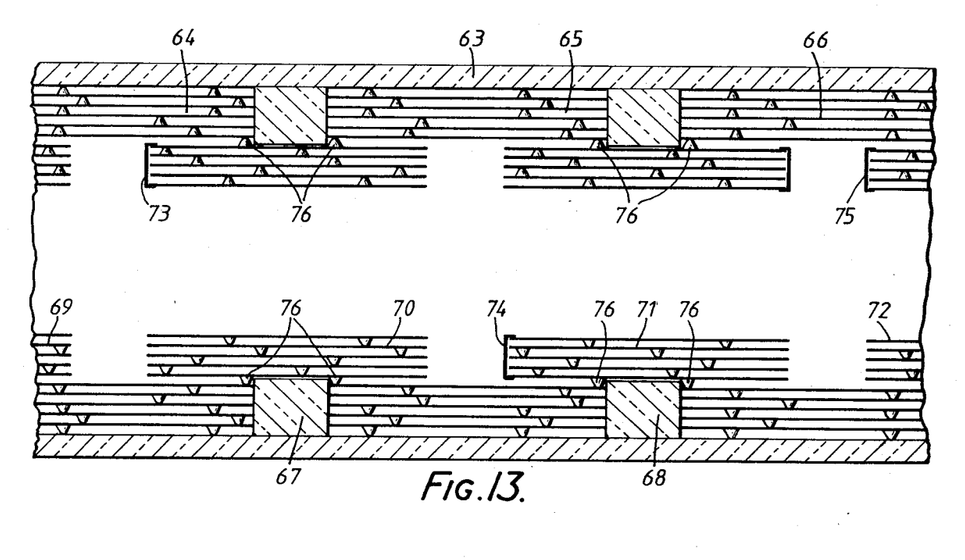
FIGS. 13, 14, 15 and 16 illustrate yet further apparatus in accordance with the invention.

With reference to FIG. 13, in another segmented arrangement in accordance with the invention, two groups of structures are located within an outer quartz containing vessel 63. A first group is located adjacent the wall of the containing vessel 63. Three structures 64, 65 and 66 of the first group are illustrated, and are spaced apart by ceramic spacers 67 and 68. A second group of structures, four of which 69, 70, 71 and 72 are shown, are located with those of the first group and are arranged to shield the ceramic spacer rings 67 and 68. Cylinders included in each of the structures of the second group are held fixed relative to other cylinders of the structure by thin metal tags 73, 74 and 75 which are welded between the outer and inner cylinders. Each structure of the second group is held substantially fixed, relative to structures of the first group, by a plurality of dimples 76 on the outer surface of the structure which are arranged on both sides of the adjacent ceramic spacer ring 67 or 68.

Figure 14:
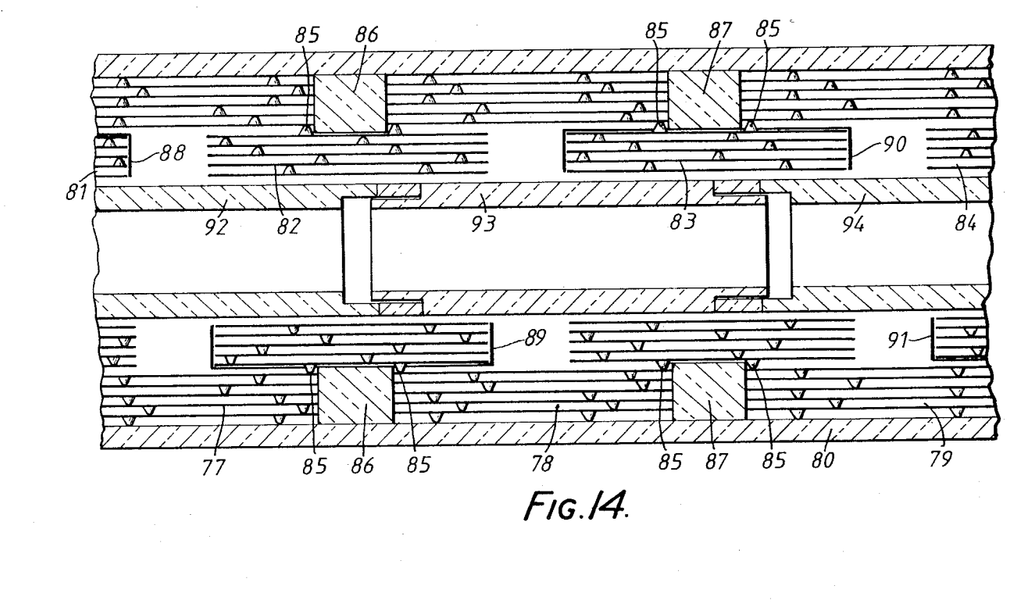

With reference to FIG. 14, in another arrangement in accordance with the invention, a first group of structures 77, 78 and 79 is located adjacent the wall of a surrounding quartz vessel 80. A second group of structures 81, 82, 83 and 84 is arranged within the first group. As in the embodiment shown in FIG. 13, the outer cylinder of each structure of the second group is located in position by dimples 85 on its outer surface which are arranged to lie on each side of a ceramic spacer ring 86 or 87 spacing apart structures of the first group. However in this embodiment, cylinders included in a structure of the second group are substantially fixed relative to each other by a retaining clip 88, 89, 90 and 91. The retaining clip 88, 89, 90 and 91 is a thin metal strip extending across the outer surface of the structure, its ends being bent to hold the cylinders in place. Labyrinthed dispenser segments 92, 93 and 94 are also included, being located within the structures of the second group.

Figure 15:
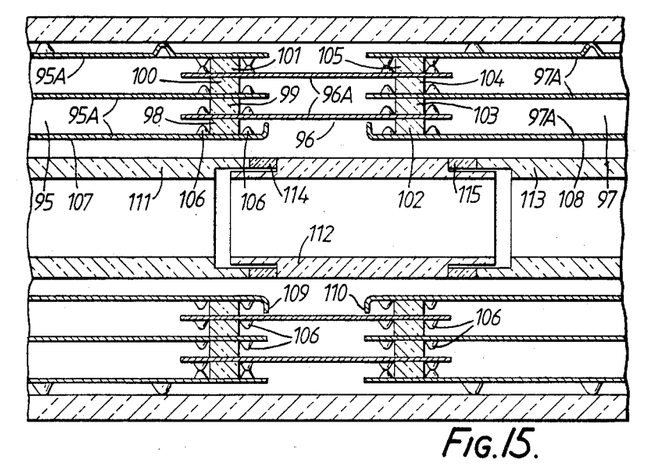

With reference to FIG. 15, a metal vapour laser discharge tube includes an outer quartz vessel and a plurality of thermally insulating structures, only three of which 95, 96 and 97, are illustrated for clarity, distributed along its longitudinal axis. The cylinders included in structures isolated from one another, 95, 96 and 97 are denoted 95A, 96A and 97A respectively. Adjacent pairs of structures 95 and 96, and 96 and 97, are arranged to overlap, that is their cylinders 95A, 96A and 97A are interleaved, and are electrically insulated from one another. A set of ceramic insulating rings 98, 99, 100 and 101 is arranged to isolate and position one adjacent pair of structures 95 and 96. Another set of ceramic insulating rings 102, 103, 104 and 105 is similarly arranged in respect of the other adjacent pair of structures shown 96 and 97. Each cylinder includes dimples 106 which locate it relative to a ceramic ring. The innermost cylinders 107 and 108 have flared ends 109 and 110, which act as shields to protect the surfaces of the ceramic rings 98 and 102 from contents of the tube. Dispenser segments 111, 112 and 113 are also included and are also labyrinthed to give additional shielding. Ceramic spacers 114 and 115 are located between the dispenser segments 111, 112 and 113 to prevent electrical contact being made between them. Manufacture of this arrangement is facilitated if the ceramic spacer rings 98 to 105 are split rings, that is each ring is in two separate halves which are clamped around a cylinder during assembly.

Figure 16:
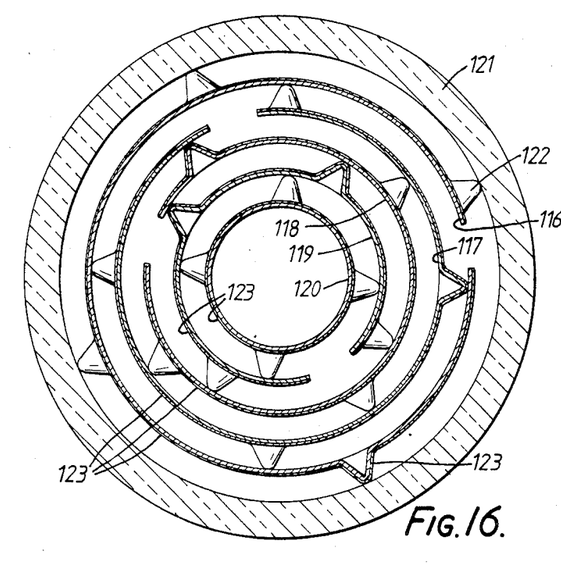

With reference to FIG. 16 which is a transverse section, discharge tube apparatus in accordance with the invention includes a plurality of molybdenum cylinders 116 to 120 arranged coaxially about one another with an outer ceramic tube 121. Each of the cylinders 116 to 120 includes a plurality of dimples 122 projecting from its outer surface to space them apart from one another and locate them within the tube 121. The outer surface, and hence the dimples 122, of each cylinder 116 to 120 is coated with a very thin layer of alumina 123 which is flamed on. This reduces thermal conduction between the cylinders 116 to 120 via the dimples 122.

Although in the previously described embodiments, where a plurality of structures are included, they are electrically isolated from one another, there may of course be other applications where this is not desired. In such a case, ceramic spacer rings may be omitted.

We claim:

1. A discharge tube apparatus, comprising:
   a hollow structure including a plurality of metal cylinders coaxially disposed about one another, an innermost one of said cylinders having an innermost surface surrounding a hollow cavity, an outermost one of said cylinders having an outermost surface;
   means for producing a discharge in said cavity which contacts said innermost surface, said means for producing a discharge including means for increasing the temperature in said cavity; and
   a plurality of mutually spaced apart spacer members having gaps therebetween, disposed between said cylinders so as to space said cylinders apart such that when said means for increasing the temperature has increased the temperature in said cavity, a desired temperature gradient between said innermost surface and said outermost surface is obtained.

2. Apparatus as claimed in claim 1, and wherein said spacer members are integral with said metal cylinders.

3. Apparatus as claimed in claim 2, and wherein said spacers are dimples.

4. Apparatus as claimed in claim 1, and wherein a surface of at least one of said metal cylinder is covered with thermally insulating material.

5. Apparatus as claimed in claim 4 and wherein the outer surface of each cylinder is covered with said thermally insulating material.

6. Apparatus as claimed in claim 1, and including a metallic member connecting one cylinder with another cylinder whereby relative movement between them is restricted.

7. Apparatus as claimed in claim 6 and wherein said metallic member is arranged through apertures in cylinders which it connects.

8. Apparatus as claimed in claim 7, wherein said plurality of cylinders includes more than two cylinders, the metallic member connecting a pair of said cylinders having respectively facing inner and outer surfaces.

9. Apparatus as claimed in claim 1 and wherein said metal cylinders are formed of refractory metal.

10. Apparatus as claimed in claim 1, having a longitudinal axis and comprising a plurality of said structures distributed along the direction of the longitudinal axis.

11. Apparatus as claimed in claim 10 further comprising a spacer formed of electrically insulating material, wherein an adjacent pair of said structures is spaced apart by said spacer formed of electrically insulating material.

12. Apparatus as claimed in claim 11 and wherein a cylinder included in one of said structures in interleaved with cylinders included in an adjacent one of said structures.

13. Apparatus as claimed in claim 12 and wherein a cylinder included in one of said structures is spaced from a cylinder included in an adjacent one of said cylinders by a spacer of electrically insulating material.

14. Apparatus as claimed in claim 10 and including a first group of said structures distributed along the direction of the longitudinal axis and a second group of structures radially inward of and electrically isolated from the structures of the first group.

15. Apparatus as claimed in claim 14 and wherein an adjacent pair of the structures of the first group are spaced apart by an electrically insulating spacer and a structure of the second group overlaps the spacer.

16. Apparatus as claimed in claim 15, further comprising metal spacers on an outer surface of the structure of the second group overlapping the insulating spacer, and wherein the structure of the second group overlapping the insulating spacer is substantially fixed relative to it by said metal spacers.

17. Apparatus as claimed in claim 1 and including an outer tube within which said structure is located.

18. An apparatus as in claim 1, wherein said cylinders include at least one intermediate cylinder having a gap therein, said at least one intermediate cylinder being disposed between said innermost and outermost cylinders.

19. A discharge tube apparatus, comprising:
a plurality of successively adjacent hollow low thermal conductivity structures disposed along a longitudinal axis, each structure including a plurality of radially spaced metal cylinders coaxially disposed about one another, an innermost one of said cylinders having an innermost surface surrounding a hollow cavity, at least one of the cylinders of each structure being interleaved with the cylinders of another one of the structures adjacent thereto;
means for holding said cylinders in radially spaced apart relation; and
means for producing a discharge in the cavities of the respective structures which contacts the respective innermost surfaces thereof.

20. Apparatus as claimed in claim 19, further comprising an electrically insulating spacer and wherein one of the cylinders included in one of said structures 95 interleaved with one of the cylinders included in an adjacent one of the structures and is spaced from it by said electrically insulating spacer.

21. Apparatus as claimed in claim 20 and wherein one of the cylinders has metal projections on a surface thereof and is substantially fixed relative to the electrically insulating spacer by said metal projections.

22. Apparatus as claimed in claim 20, further comprising a cylinder shielding a surface of the spacer from direct exposure to a discharge within the cavity.

23. Apparatus as claimed in claim 21 and wherein the cylinder shielding the insulative spacer has an end substantially parallel to said surface of said one of the cylinders.

24. Apparatus as claimed in claim 1 and including a dispenser segment in said cavity for dispensing a substance in said cavity which forms at least part of a laser active medium.

25. Apparatus as claimed in claim 24, further comprising an electrically insulating surface radially inward of said outermost surface and wherein said segment shields said electrically insulating surface.

26. Apparatus as claimed in claim 24 and including two adjacent dispenser segments overlapping and being electrically isolated from one another.

27. Apparatus as claimed in claim 26 and wherein one of the adjacent dispenser segments includes a projecting portion and the other includes an indentation in which the projecting portion lies.

28. An apparatus as in claim 19, wherein said means for producing a discharge includes means for increasing the temperature in said cavities, said structures including means for producing a desired temperature gradient between said innermost surface and said outermost surface when said means for increasing the temperature has increased the temperature in said cavities.

29. A laser discharge tube apparatus, comprising:
a hollow structure including a plurality of metal cylinders coaxially disposed about one another, an innermost one of said cylinders having an innermost surface surrounding a hollow cavity, an outermost one of said cylinders having an outermost surface;
means, including a metal vapor laser active medium in said cavity, for producing a discharge at a very high temperature in said cavity which contacts said innermost surface, said means for producing a discharge including means for increasing the temperature in said cavity; and
a plurality of mutually spaced apart spacer members having gaps therebetween, disposed between said cylinders so as to space said cylinders apart such that when said means for increasing the temperature has increased the temperature in said cavity a desired temperature gradient between said innermost surface and said outermost surface is obtained, whereby the apparatus is operable without a flowthrough of a buffer gas.

* * * * *